(12) United States Patent
Wernersson

(10) Patent No.: US 7,593,627 B2
(45) Date of Patent: Sep. 22, 2009

(54) ANGLE CORRECTION FOR CAMERA

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 351 days.

(21) Appl. No.: 11/530,607

(22) Filed: Sep. 11, 2006

(65) Prior Publication Data
US 2008/0044169 A1 Feb. 21, 2008

Related U.S. Application Data

(60) Provisional application No. 60/822,813, filed on Aug. 18, 2006.

(51) Int. Cl.
G03B 17/00 (2006.01)
(52) U.S. Cl. .......................... 396/50; 396/53; 396/147; 396/429
(58) Field of Classification Search .................. 396/50, 396/53, 147, 148, 429; 348/208.3
See application file for complete search history.

(56) References Cited

U.S. PATENT DOCUMENTS

| 5,541,697 | A | * | 7/1996 | McIntyre | 396/50 |
| 5,794,078 | A | * | 8/1998 | Okazaki | 396/50 |
| 5,799,037 | A | * | 8/1998 | Strolle et al. | 375/233 |
| 5,900,909 | A | * | 5/1999 | Parulski et al. | 348/231.6 |
| 6,148,149 | A | * | 11/2000 | Kagle | 396/50 |
| 6,262,769 | B1 | * | 7/2001 | Anderson et al. | 348/333.1 |
| 6,317,192 | B1 | * | 11/2001 | Silverbrook et al. | 355/18 |
| 7,375,755 | B2 | * | 5/2008 | Oya et al. | 348/333.02 |
| 2004/0252200 | A1 | * | 12/2004 | Thomas | 348/208.4 |
| 2005/0264653 | A1 | * | 12/2005 | Starkweather et al. | 348/208.3 |
| 2006/0204232 | A1 | * | 9/2006 | Weinberg et al. | 396/50 |
| 2006/0291840 | A1 | * | 12/2006 | Murata et al. | 396/50 |
| 2007/0098380 | A1 | * | 5/2007 | Spielberg | 396/50 |
| 2007/0172229 | A1 | * | 7/2007 | Wernersson | 396/429 |
| 2007/0223900 | A1 | * | 9/2007 | Kobayashi et al. | 396/50 |

FOREIGN PATENT DOCUMENTS

| JP | 2002-271654 | 9/2002 |
| WO | WO 2006/005129 A1 | 1/2006 |

OTHER PUBLICATIONS

"Accelerometer Factsheet: MEMS 3-Axis Accelerometer", Fujitsu, www.fme.fujitsu.com, 2 pages.
"Piezoelectric Vibratory Gyro Sensor", Fujitsu, www.edevice.fujitsu.com/fmd/, Oct. 2005, 2 pages.
"LIS3L02AL MEMS Inertial Sensor: 3-axis-+/-2g ultracompact linear accelerometer", www.st.com, May 2006, 17 pages.
International Search Report and Written Opinion for PCT/IB2007/050517, mailed Jun. 19, 2007, (11 pages).
International Preliminary Report on Patentability issued for PCT/IB2007/050517, mailed Nov. 28, 2008, 7 pages.

* cited by examiner

Primary Examiner—Patrick J Assouad
Assistant Examiner—Bret Adams
(74) Attorney, Agent, or Firm—Harrity & Harrity, LLP

(57) ABSTRACT

A device may include a camera to capture an image; a sensor to measure, when the camera captures the image, information indicative of an angular displacement, about a line of sight of the camera, of an orientation of the device away from a reference orientation of the device; storage to store the measured information for rotating the image relative to a frame of the image based on the angular displacement.

16 Claims, 16 Drawing Sheets

ANGLE CORRECTION FOR CAMERA

RELATED APPLICATIONS

This application claims priority under 35 U.S.C. §119 based on U.S. Provisional Application Ser. No. 60/822,813, filed Aug. 18, 2006, the disclosure of which is incorporated herein by reference.

BACKGROUND

1. Related Field

Embodiments described herein relate generally to angle correction for a camera.

2. Description of Related Art

It is sometimes difficult for a camera user to determine when a camera is level, especially when handling a small camera, such as a camera in a mobile phone. As a result, an image captured by the camera may have a "tilted horizon," e.g., the horizon is not level or square with the frame of the image. It may also difficult for the camera user to determine when the camera is oriented in undesirable directions.

SUMMARY

In one aspect, a device is provided. The device may include a camera to capture an image; a sensor to measure information indicative of an angular displacement, about a line of sight of the camera, of an orientation of the camera away from a reference orientation of the camera when the camera captures the image; and storage to store the measured information for rotating the image relative to a frame of the image based on the angular displacement.

In another aspect, the device may include a processor to rotate the image relative to the frame of the image based on the angular displacement. In another aspect, the storage stores the rotated image.

In another aspect, the device includes a communication interface for transferring the measured information and the image to a computer for rotating the image relative to the frame of the image based on the angular displacement.

In another aspect, the device includes an indicator to indicate when the angular displacement is zero.

In another aspect, the device includes a processor to capture automatically the image when the angular displacement is zero.

In another aspect, a method is provided. The method includes capturing an image in a camera; when capturing the image, measuring information indicative of an angular displacement, about a line of sight of the camera, of an orientation of the camera away from a reference orientation of the camera; storing the measured information for rotating the image relative to a frame of the image based on the angular displacement; rotating the image relative to the frame of the image based on the angular displacement; and storing the rotated image.

In another aspect, the method includes transferring the stored measured information and the image to a computer for rotating the image relative to the frame of the image based on the angular displacement.

In another aspect, the method includes indicating when the angular displacement is zero.

In another aspect, the method includes automatically capturing the image when the angular displacement is zero.

In another aspect, a computer-readable medium having a data structure is provided. The data structure includes a first data field to store an image captured by a camera; and a second data field to store information measured by a sensor when the camera captured the image, the measured information indicative of an angular displacement of an orientation of the camera away from a reference orientation of the camera.

In another aspect, the computer-readable medium includes instructions to receive measured information for rotating an image relative to a frame of the image, wherein the image was captured by a camera, wherein the measured information is indicative of an angular displacement, about a line of sight of the camera, of an orientation of the camera away from a reference orientation of the camera, and wherein the information was measured when capturing the image; rotate the image relative to the frame of the image based on the angular displacement; and store or display the rotated image.

In another aspect, a device is provided. The device includes means for capturing an image in a camera; means for measuring, when capturing the image, information indicative of an angular displacement of an orientation of the camera away from a reference orientation of the camera; and means for storing the measured information for rotating the image relative to a frame of the image based on the angular displacement.

In another aspect, the device includes means for rotating the image relative to the frame of the image based on the angular displacement, and wherein the means for storing stores the rotated image.

In another aspect, the device includes means for transferring the stored measured information and the image to a computer for rotating the image relative to the frame of the image based on the angular displacement.

In another aspect, the device includes means for indicating when the angular displacement is zero.

In another aspect, the device includes means for automatically capturing the image when the angular displacement is zero.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description refers to the accompanying drawings. The same reference numbers in different drawings may identify the same or similar elements. Also, the following detailed description does not limit the scope of the claims. Rather, the claims define the scope of the inventions described herein.

Exemplary Devices

Figure 1A:
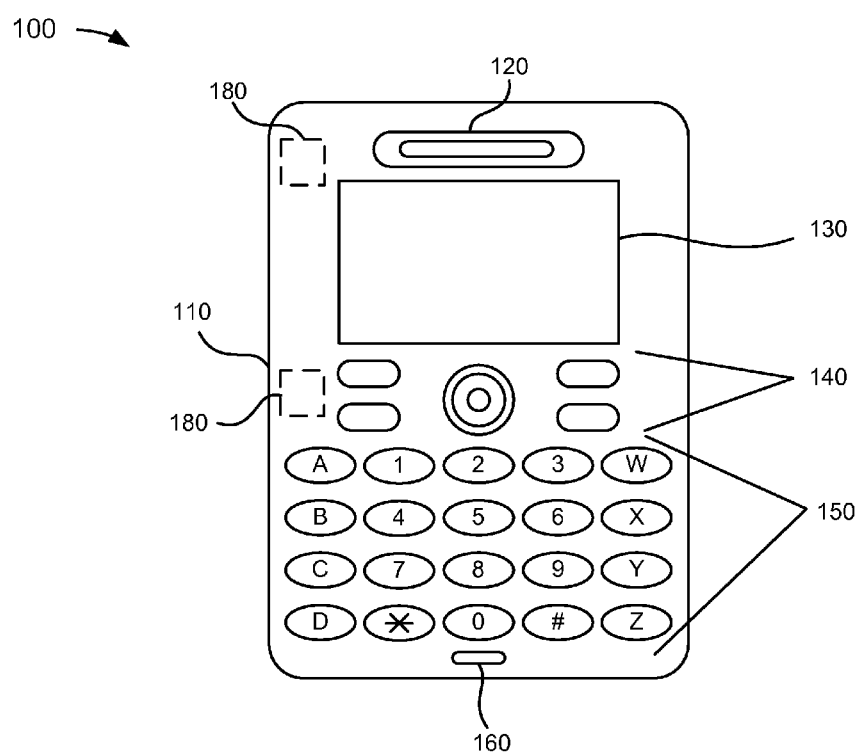
FIGS. 1A and 1B are diagrams of an exemplary device and environment in which embodiments described herein may be implemented.
Figure 1B:
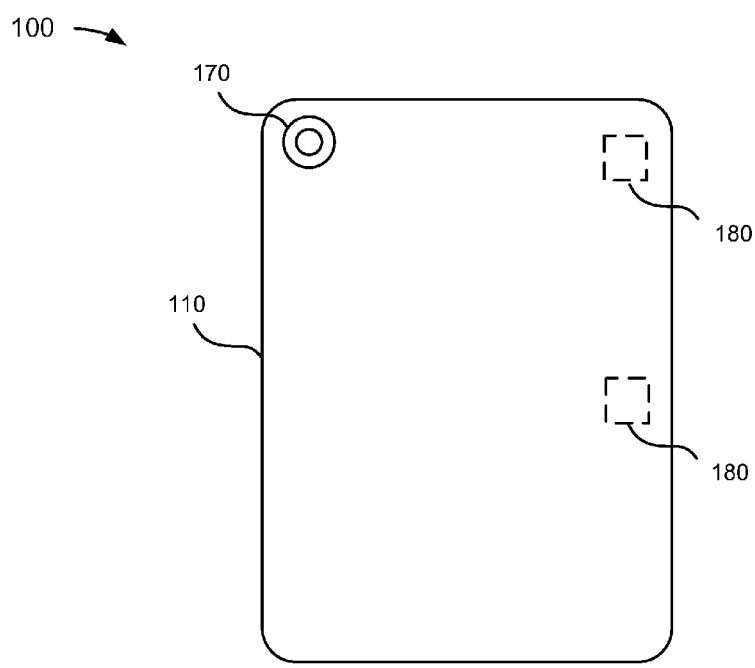

FIGS. 1A and 1B are diagrams of an exemplary device 100 in which embodiments described herein may be implemented. FIG. 1A is the front of device 100 and FIG. 1B is the back of device 100. As used herein, a "device" may include a radiotelephone; a personal communications system (PCS) terminal that may combine a cellular radiotelephone with data processing, facsimile, and/or data communications capabilities; a personal digital assistant (PDA) that may include a radiotelephone, pager, Internet/intranet access, web browser, organizer, calendar, a Doppler receiver, and/or global positioning system (GPS) receiver; a laptop; a GPS device; a computer; an MP3 player (e.g., an iPod); a printer; a facsimile machine; a pager; a camera (e.g., film or digital camera); a video camera (e.g., a camcorder); binoculars; a telescope; and/or any other device capable of using a camera.

Device 100 may include housing 110, speaker 120, display 130, control keys 140, keypad 150, microphone 160, camera 170, and angle sensor 180. Housing 110 may protect the components of device 100 from outside elements. Housing 110 may be made from thermoplastics, metals, elastomers (e.g., synthetic rubber and/or natural rubber), and/or other similar materials. Speaker 120 may provide audible information to a user of device 100. Display 130 may provide visual information to the user. For example, display 130 may provide information regarding incoming or outgoing telephone calls, games, telephone numbers, the current time, e-mail, etc. Control keys 140 may permit the user to interact with device 100 to cause device 100 to perform one or more operations. Keypad 150 may include a standard telephone keypad and may include additional keys to enable typing information into device 100. Microphone 160 may receive audible information from the user.

Camera 170 may enable device 100 to capture and/or store video and/or images (e.g. pictures). Camera 170 may be on the front side of device 100 (not shown) and/or the rear side of device 100 (as shown in FIG. 1B). Control keys 140 may include, for example, a shutter key for the user to take a picture with camera 170. Display 130 may display captured or stored video and/or images. Camera 170 may be an electronic device that may capture and/or store images and/or video digitally or using photographic film.

Angle sensor 180 may measure an orientation of camera 170. Angle sensor 180 may include one or more gyroscopes (also referred to herein as gyros). A gyro may include, for example, a disk or wheel that can turn on its axis to maintain its orientation regardless of movement of device 110. Angle sensor 180 may include a vibrating piezoelectric gyroscopic sensor, such as the "Piezoelectric Vibratory Gyro Sensor," sold by Fujitsu. Angle sensor 180 may alternatively include a three-axis accelerometer, such as the FAR-S2AB series accelerometer manufactured by Fujitsu or the LIS3L02AL accelerometer manufactured by ST Microelectronics.

Alternatively, angle sensor 180 may include a plum, e.g., a pendulum, with an optical sensor or a potentiometer. Angle sensor 180 may alternatively include a fluid switch, such as a mercury switch. Angle sensor 180 may alternatively include a receiver for receiving position and/or angle information from a mobile telephone communication tower. Angle sensor 180 may include multiple portions in different parts of device 100. Angle sensor 180 may include other types of sensors associated with sensing orientation of camera 170.

Figure 2:
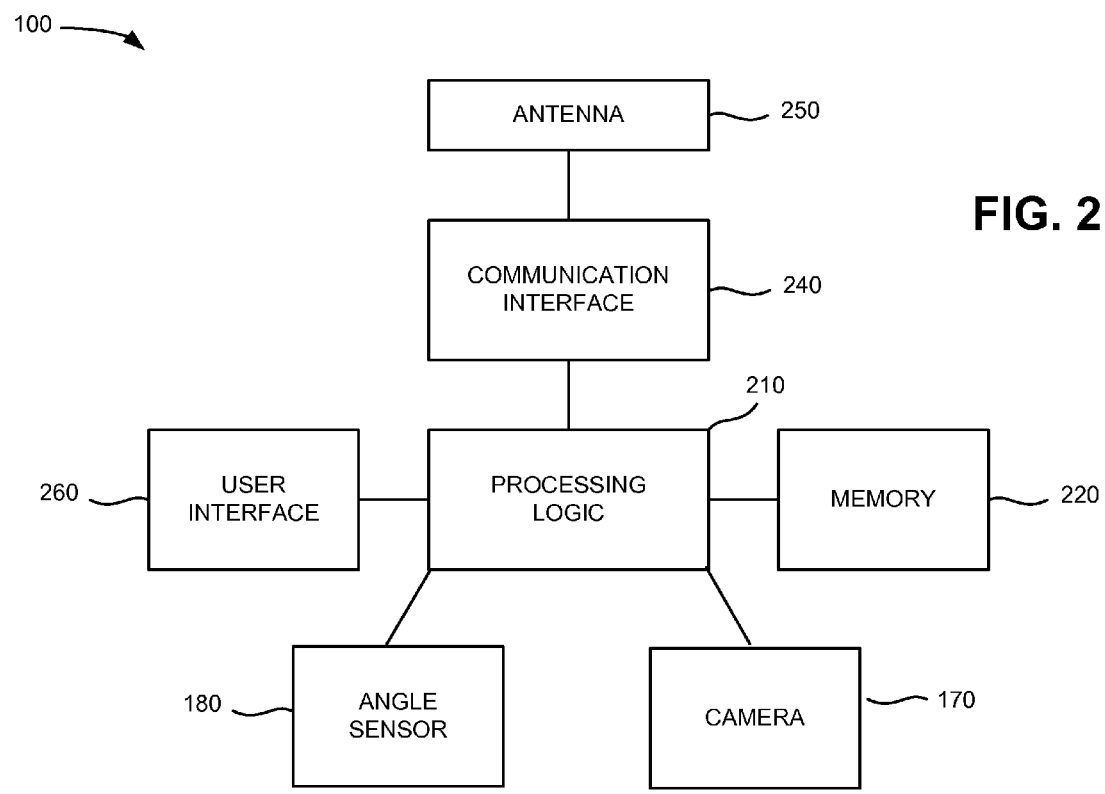
FIG. 2 is a diagram of exemplary components of the device of FIGS. 1A and 1B.

FIG. 2 is a diagram of exemplary components of the system architecture of device 100 of FIGS. 1A and 1B. As shown in FIG. 2, device 100 may include processing logic 210, memory 220, communication interface 240, antenna 250, user interface 260, camera 170, and angle sensor 180. Processing logic 210 may include a processor, microprocessor, an application specific integrated circuit (ASIC), or a field programmable gate array (FPGA). Processing logic 210 may include data structures or software programs to control operation of device 100 and its components. Memory 220 may include a hard disk drive (HDD), a random access memory (RAM), a read only memory (ROM), flash memory, a removable memory, and/or another type of memory to store data and/or instructions that may be used by processing logic 210, e.g., any type of a computer-readable medium. Camera 170 may store captured video and/or images, e.g., pictures, in memory 220. Display 130 may display stored video and/or images, e.g., pictures, from memory 220.

Communication interface 240 may include, for example, a USB port for communications over a cable. Communication interface 240 may include a transmitter that may convert baseband signals from processing logic 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna 250 for transmission and reception of the RF signals. Antenna 250 may include one or more antennas to transmit and receive RF signals over the air. Antenna 250 may receive RF signals from communication interface 240 and transmit them over the air and receive RF signals from over the air and provide them to communication interface 240. Communication interface 240 may incorporate the Bluetooth standard or a USB serial port standard.

User interface 260 may include mechanisms for inputting information into device 100 and/or for outputting information from device 100. Examples of input and output mechanisms may include speaker 120 to output audio signals, microphone 160 to receive audio signals, keys 140 or 150 to permit data and control commands to be input, and/or display 130 to output visual information. Display 130 may show content, such as pictures or videos. Speaker 120 may play content, such as music or radio programming. User interface 260 may also include a vibrator mechanism that causes device 100 to vibrate when, for example, an incoming telephone call is received. User interface 260 may allow the user to receive a menu of options. The menu may allow the user to select various functions or modes associated with applications executed by device 100. User interface 260 may allow the user to activate a particular mode, such as a mode defined by an application running in device 100.

Figure 3:
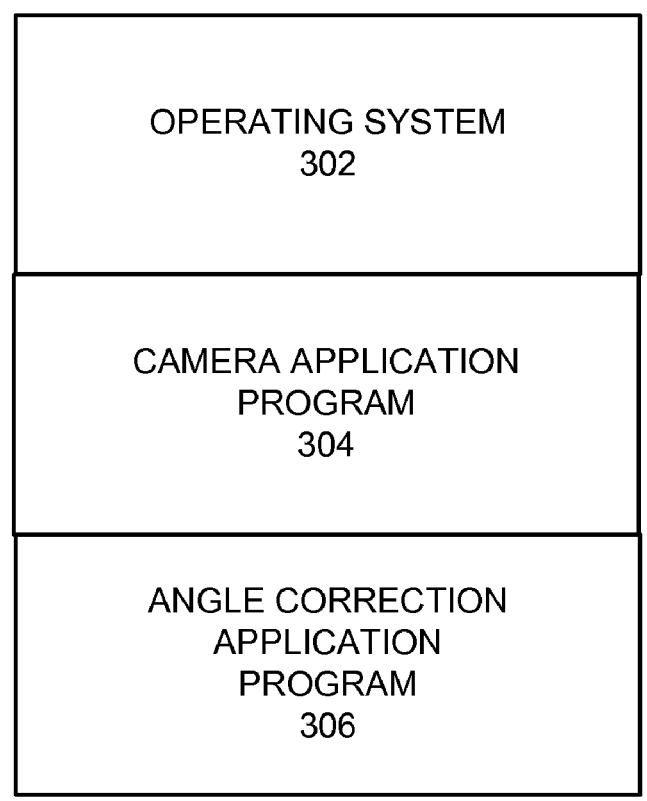
FIG. 3 is a block diagram of exemplary software components that may be implemented in the device of FIG. 1.

FIG. 3 is a block diagram of exemplary software components that may be implemented in device 100 of FIG. 1. Referring to FIG. 3, memory 220 may include operating system 302, camera application program 304, and angle correction application program 306. Operating system 302 provides a software platform on top of which application programs, such as camera application program 304 and angle correction application program 306, can run. Camera application program 304 or angle correction application program 306 are described in more detail below. Memory 220 may include other application programs not shown in FIG. 3.

Exemplary Processes

Figure 4:
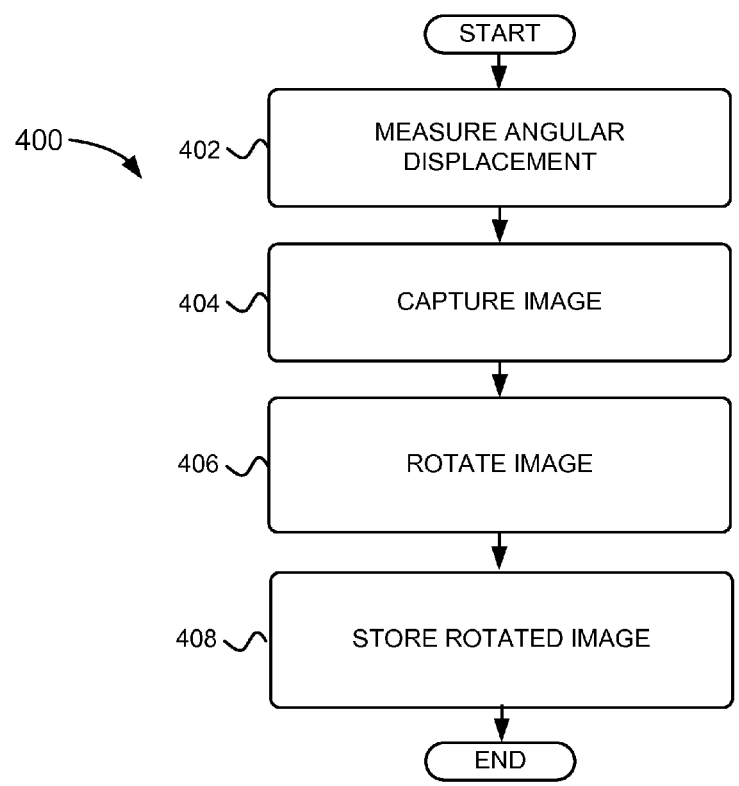
FIG. 4 is a flow chart of an exemplary process in one embodiment for angle correction described herein.
Figure 5:
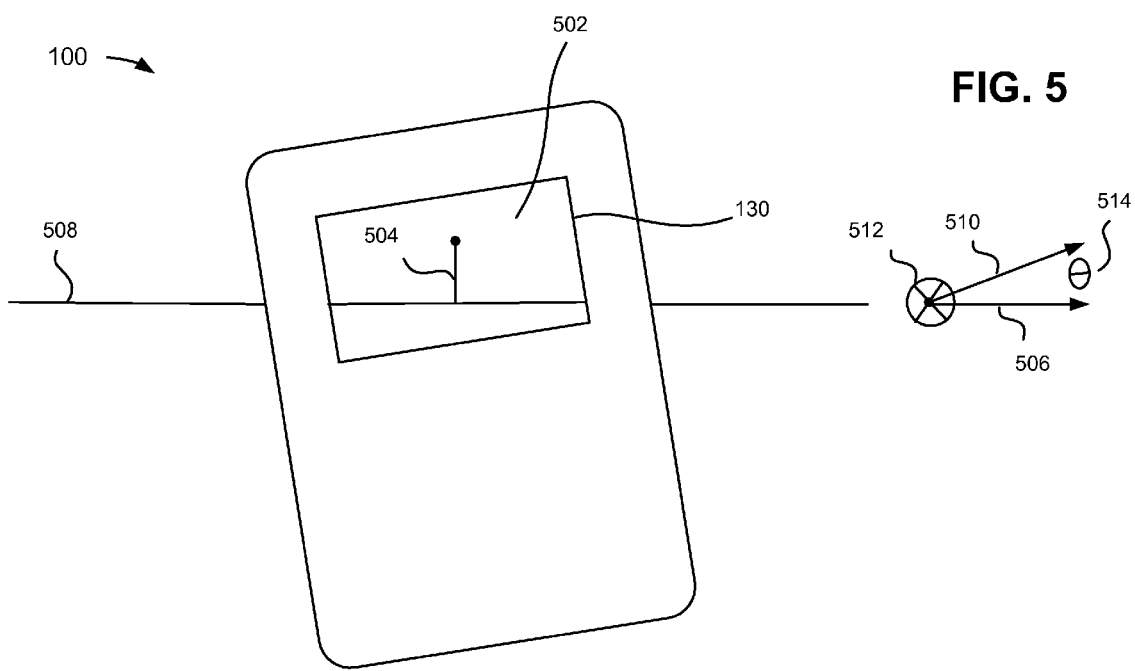
FIG. 5 is a block diagram of an exemplary operation of the angle sensor of FIG. 1.

FIG. 4 is a flow chart of an exemplary process 400 in one embodiment for angle correction described herein. A displacement angle of camera 170 may be measured relative to a reference orientation (block 402). FIG. 5 is a diagram showing an exemplary measurement of a displacement angle of camera 170 relative to a reference orientation. FIG. 5 shows device 100 displaying image 502 on display 130. Display 130 may show image 502 as captured by camera 170, for example. Image 502 may include a vertical object 504, the view of which may be obstructed by device 100, e.g., object 504 may be behind device 100 in FIG. 5.

As evident in the exemplary embodiment of FIG. 5, camera 170 is not "level," which may be undesirable to the user. Vector 506 is in the horizontal plane defined by horizon 508. Vector 512 is in the direction of the "line of sight" ("LOS") of camera 170. Vector 510 is an axis of camera 170 normal to LOS vector 512. Angle sensor 180 may measure the "orientation" of camera 170, e.g., the angular displacement of camera 170 about LOS vector 512 relative to a reference orientation, such as "level" or "horizontal." For example, it may be desirable to have the orientation of camera 170 such that vector 510 is coincident with horizon vector 506, wherein horizon vector 506 is the reference orientation. In the example of FIG. 5, camera 170 has an angular displacement θ about LOS vector 512 relative to the reference orientation, e.g., vector 506.

Returning to process 400 of FIG. 4, in one embodiment, measuring the angle of orientation includes measuring displacement angle 514. Image 502 may be captured (block 404) using, for example, camera 170. Image 502 may be captured when, for example, the user presses a shutter key. Captured image 502 may be rotated relative to the frame of image 502 based on the displacement angle 514 (block 406). Rotating an image relative to the frame of the image may include a known process and is described in more detail in FIGS. 6A, 6B, and 6C below. The rotated image may be stored (block 408) in, for example, memory 220 as an image file.

Figure 6A:
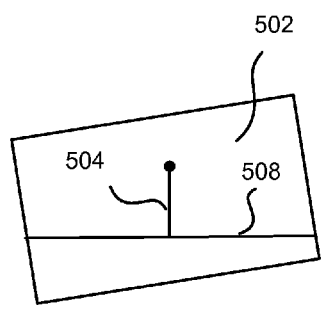
FIGS. 6A, 6B, and 6C are exemplary diagrams of images consistent with embodiments described herein.
Figure 6B:
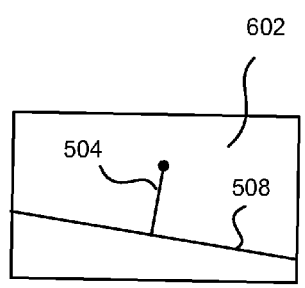
Figure 6C:
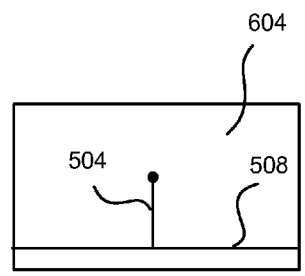

FIGS. 6A, 6B, and 6C are exemplary diagrams of images, including an image rotated relative to its frame, consistent with embodiments described herein. Image 502 appears in FIG. 6A as it appears in FIG. 5. As discussed above, the frame of image 502 is not at the reference orientation, e.g., horizontal, because displacement angle 514 is greater than zero. Rotating image 502 may result in image 602 as shown in FIG. 6B. Although the frame of image 602 may be at the reference orientation, object 504 in FIG. 6B is no longer vertical and horizon 508 in FIG. 6B is no longer level. Rotating captured image 502 relative to the frame of image 502 based on displacement angle 514, for example, may level horizon 508 and return object 504 to vertical while keeping the frame of image 602 at the reference orientation. Thus, after rotation of image 502 relative to the frame of image 502, image 502 may appear as it does in FIG. 6C as image 604. In image 604 of FIG. 6C, horizon 508 and the frame of image 604 may be at the reference orientation. Further, in image 604 of FIG. 6C, object 504 may be vertical. The process of "rotating" image 502 relative to the frame of image 502 may include cropping, enlarging, and/or rotating the frame of image 502 using known software techniques.

The absolute value of displacement angle 514 may be greater than or equal to 0° and (1) less than 1°; (2) less than 2°; (3) less than 3°; (4) less than 4°; (5) less than 5°; (6) less than 10°; (7) less than 15°; (8) less than 20°; (9) less than 25°; (10) less than 30°; (11) less than 40°; or (12) less than 45°. As used herein, displacement angle values are approximate and may be positive or negative. Further, as used herein, "less than" means "approximately less than," which includes "less than or equal to."

In one embodiment, process 400 may distinguish between an image captured in "portrait" mode versus an image captured in "landscape" mode. As used herein, "portrait" mode is where the major axis of the image is vertical and "landscape" mode is where the major axis of the image is horizontal. In one embodiment, process 400 may also distinguish between an image captured upside down, in either the portrait or landscape mode. For example, if the absolute value of displacement angle 514 is less than 45°, process 400 may rotate image 502 relative to its frame based on the displacement angle 514. If the absolute value of displacement angle is greater than 45° but less than 135°, then process 400 may rotate image 502 relative to its frame based on 90° minus displacement angle 514. If the absolute value of displacement angle 514 is greater than 135° but less than 225°, then process 400 may rotate image 502 relative to its frame based on 180° minus the displacement angle 514. If the absolute value of displacement angle 514 is greater than 225° but less than 315°, then process 400 may rotate image 502 relative to its frame based on 270° minus displacement angle 514.

Process 400 of FIG. 4 may be performed by camera application program 304 and angle correction application program 306 running in memory 220 of device 100. Although process 400 in FIG. 4 shows blocks 402-408 in a particular order, process 400 is not limited to blocks 402-408 being in this particular order. For example, displacement angle 514 may be measured before capturing image 502, after capturing image 502, or during capturing of image 502. Displacement angle 514 may indicate the angle of displacement "when" capturing image 502. As used herein, "when capturing image 502" means approximately when capturing image 502. For example, sensor 180 measures displacement angle 514 "when capturing image 502," meaning that sensor 180 may measure displacement angle 514 soon before capturing the image, soon after capturing the image, or during capturing of image 502.

Figure 7:
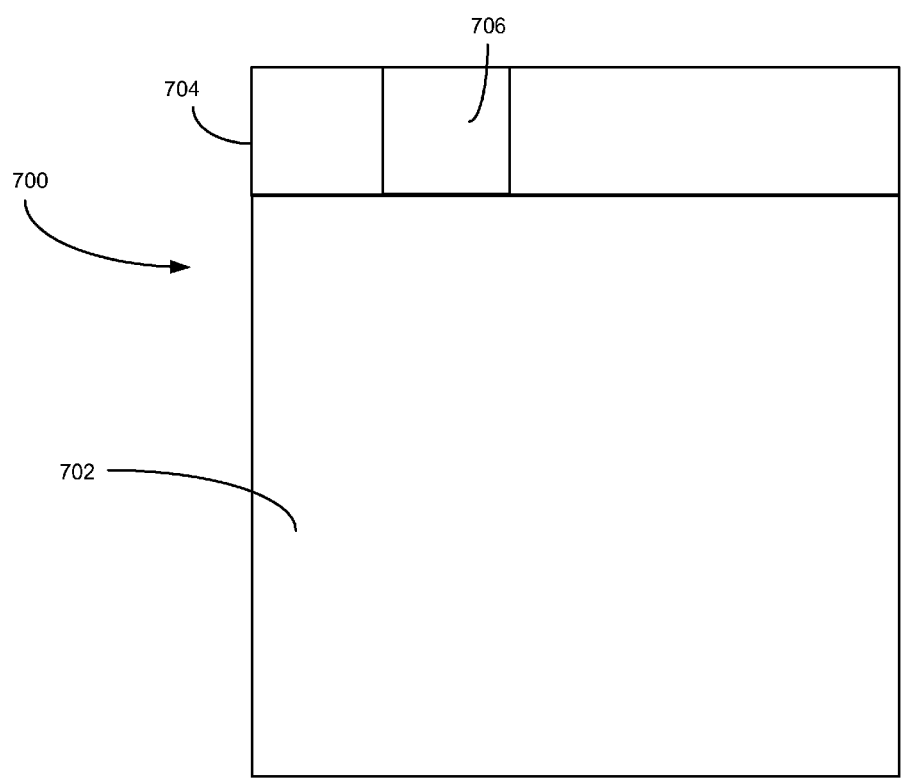
FIG. 7 is a block diagram of an exemplary image file consistent with embodiments described herein.

In process 400 of FIG. 4, the rotated image may be stored in memory 220, for example. In one embodiment, captured image 502 is stored in memory 220 in its un-rotated form, along with information regarding displacement angle 514. For example, FIG. 7 is a block diagram of an exemplary image file 700 consistent with embodiments described herein. Image file 700 may include image data 702 that stores un-rotated captured image 502. Image file 700 may include header 704. Header 704 may include field 706 that stores displacement angle 514 information. Displacement angle 514 information may include the reference orientation, such as "level," "horizontal," or horizontal vector 506. Image file 700 may be stored in memory 220. Image file 700 may allow for later processing of image 502 based on angle displacement 514 information. In one embodiment, the user may select whether to store image 502 in a rotated or un-rotated form in memory 220.

Figure 8:
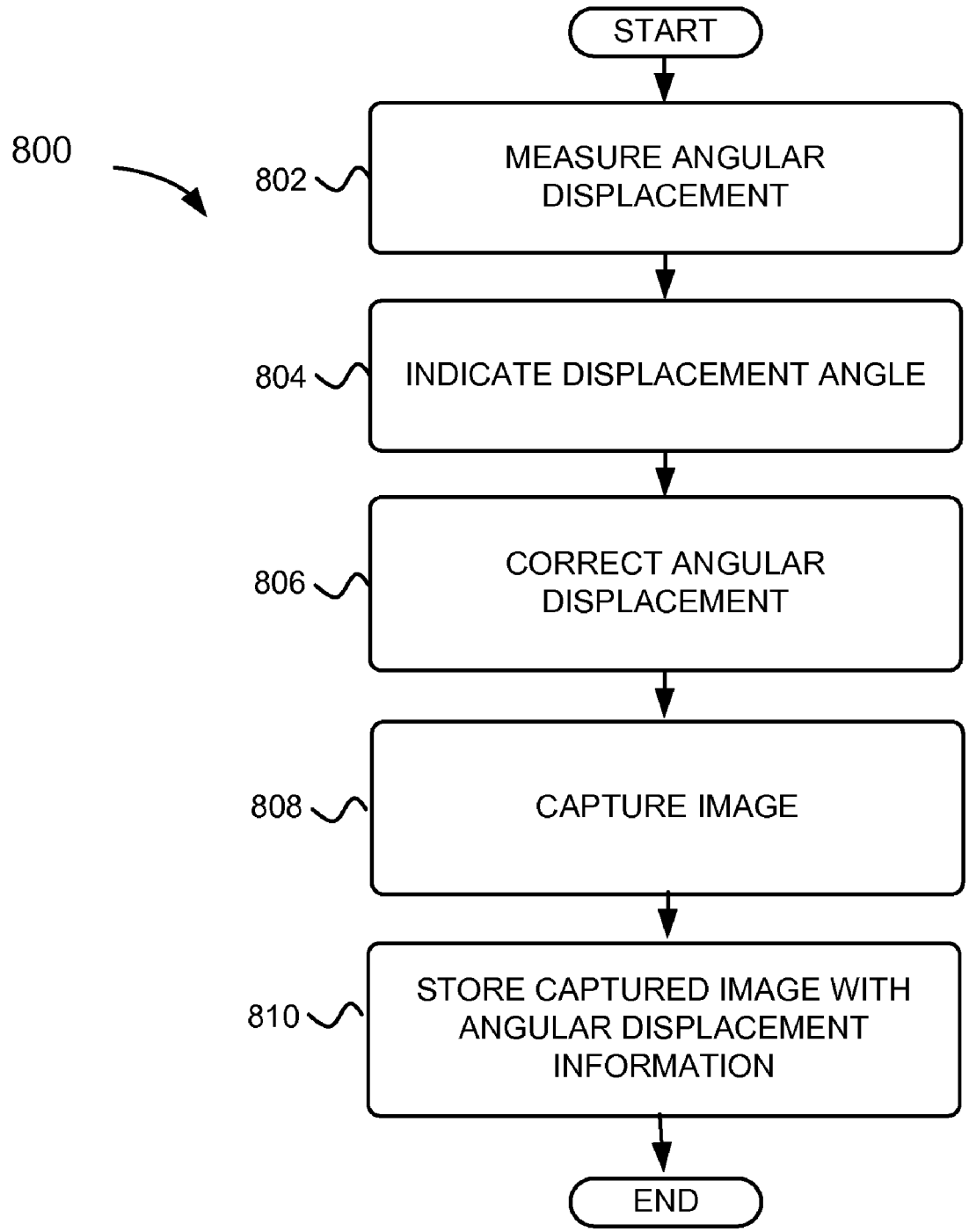
FIG. 8 is a flow chart of an exemplary process for angle correction for one embodiment described herein.
Figure 9A:
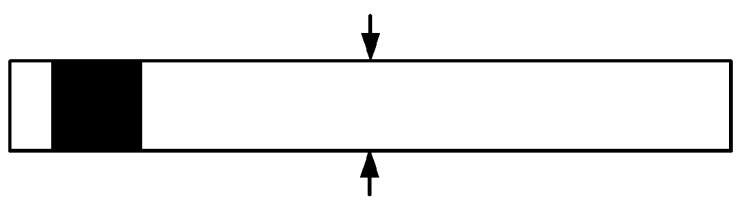
FIGS. 9A-C, 10A-C, and 11A-C are examples of displays indicating displacement angle in embodiments described herein.
Figure 9B:
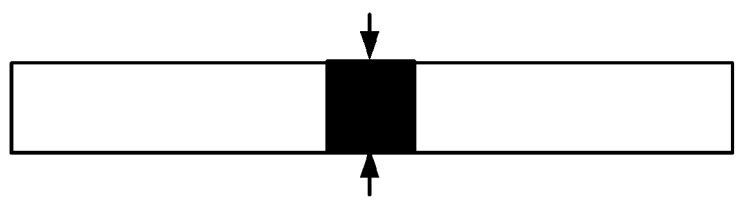
Figure 9C:
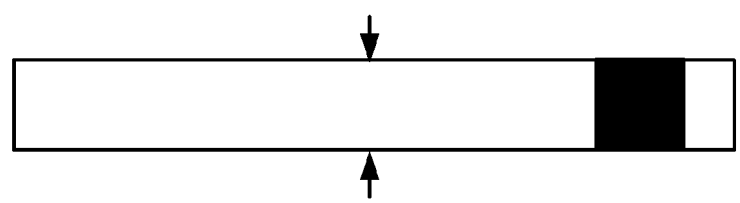
Figure 10A:
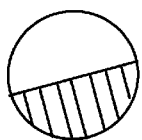
Figure 11A:
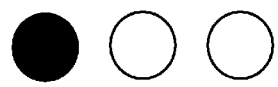
Figure 11B:
Figure 10B:
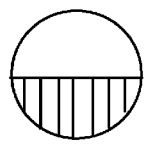
Figure 11C:
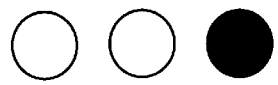
Figure 10C:
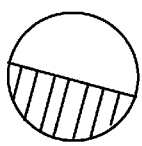

FIG. 8 is a flow chart of an exemplary process 800 for angle correction for one embodiment described herein. Reference is made to FIG. 5 for exemplary purposes. An angle of camera 170 may be measured relative to a reference orientation, such as horizon 508 (block 802). In other words, displacement angle 514 may be measured. Displacement angle 514 may be indicated (block 804), for example, on display 130. FIGS. 9A-C, 10A-C, and 11A-C are examples of displays that may indicate displacement angle 514 in embodiments described herein. FIGS. 9B, 10B, and 11B may indicate that camera 170 is level. FIGS. 9A, 10A, and 11A may indicate that camera 170 is not level, e.g., that camera 170 may be rotated counter-clockwise relative to level camera 170. FIG. 9C, 10C, and 11C may indicate that camera 170 is not level, e.g., that camera 170 may be rotated clockwise relative to level camera 170. In one embodiment, displacement angle 514 may be indicated by sounding an alarm when camera 170 is not level. In one embodiment, displacement angle 514 may be indicated by sounding an alarm when camera 170 is level. Camera 170 may be leveled (block 806). Image 502 may be captured (block 808) using camera 170. Image 502 may be captured when, for example, the user presses a shutter key. Captured image 502 may be stored with information regarding displacement angle 514 (block 810) in, for example, memory 220 as image file 700.

Process 800 of FIG. 8 may be performed by camera application program 304 and angle correction application program 306 running in memory 220 of device 100. Although process 800 in FIG. 8 shows blocks 802-810 in a particular order, process 800 is not limited to blocks 802-810 being in this particular order. For example, displacement angle 514 may be measured before capturing image 502, after capturing image 502, or during capturing of image 502.

Figure 12:
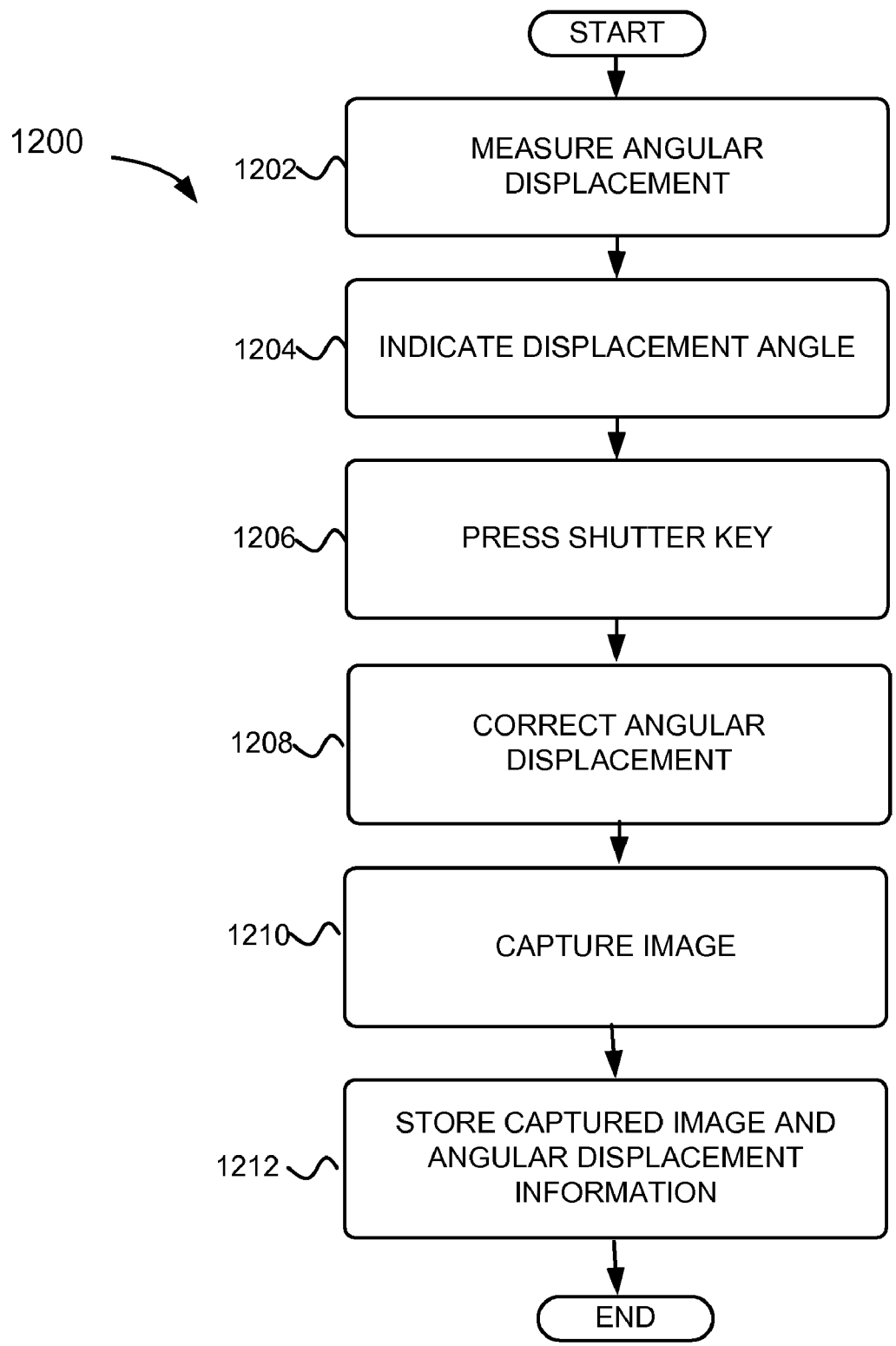
FIG. 12 is a flow chart of an exemplary process for angle correction for one embodiment described herein.

FIG. 12 is a flow chart of an exemplary process 1200 for angle correction for one embodiment described herein. Reference is made to FIG. 5 for exemplary purposes. An angle of camera 170 may be measured relative to a reference orientation, such as horizon 508 (block 1202). In other words, displacement angle 514 may be measured. Displacement angle 514 may be indicated, for example, on display 130. FIGS. 9A-C, 10A-C, and 11A-C are examples of displays indicating displacement angle 514 (block 1204) described above with respect to process 800 of FIG. 8. Device 100 may be leveled (block 1208). Image 502 may be captured using camera 170 (block 1210). Image 502 may automatically be captured when, for example, process 800 determines displacement angle 514 is zero. In this embodiment, a shutter key may have been pressed (block 1206) prior to leveling camera 170 with the understanding that camera 170 may automatically capture image 502 (block 1210) when displacement angle 514 is zero. Image 502 may be stored with information regarding displacement angle 514 (block 1212) in, for example, memory 220 as image file 700.

Process 1200 of FIG. 12 may be performed by camera application program 304 and angle correction application program 306 running in memory 220 of device 100. Although process 1200 in FIG. 12 shows blocks 1202-1210 in a particular order, process 1200 is not limited to blocks 1202-1210 being in this particular order. For example, displacement angle 514 may be measured before capturing image 502, after capturing image 502, or during capturing of image 502.

Exemplary Post Processes

As mentioned above, image file 700 may allow for later processing of image 502 based on angle displacement 514 information. Later processing may take place on a computer, for example, coupled to memory 220 in device 100. Although a process may be characterized as a "post" process for a "later" time, the post-process may be performed at any time.

Figure 13:
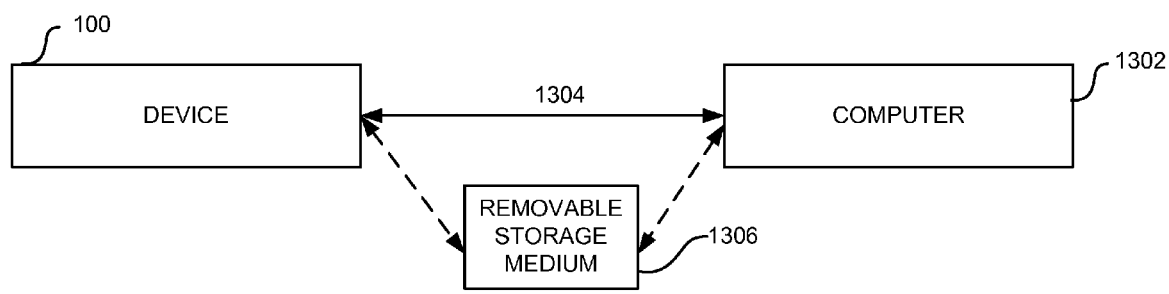
FIG. 13 is a block diagram of an exemplary environment in which embodiments described herein may be implemented.

FIG. 13 is a block diagram of an exemplary environment 1300 in which "post processing" embodiments described herein may be implemented. Environment 1300 may include device 100, computer 1302, removable storage medium 1306, and/or communication link 1304. Removable storage medium 1306 may form part of memory 220 of device 100, for example. As such, removable storage medium 1306 may store captured video and/or images, e.g., pictures, from camera 170. Removable storage medium 1306 may be transferred from device 100 to computer 1302. As a result of transferring removable storage medium 1306, captured video and/or images, e.g., pictures, from camera 170 may be transferred from device 100 to computer 1302. Alternatively, captured video and/or images, e.g., pictures, from camera 170 may be transferred from device 100 to computer 1302 via communication link 1304, such as a USB cable, for example.

Figure 14:
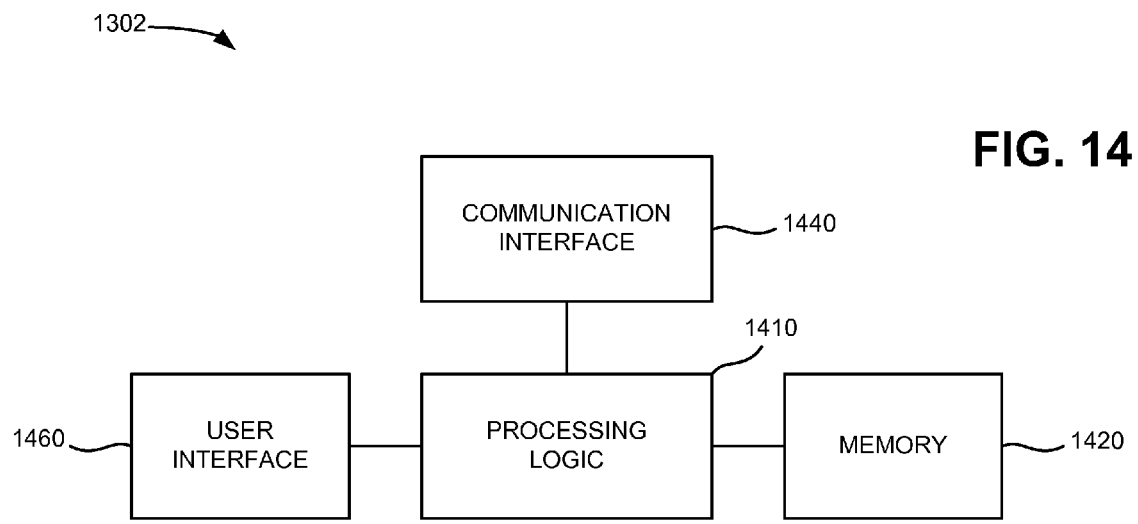
FIG. 14 is a diagram of exemplary components of the computer of FIG. 13.

FIG. 14 is a diagram of exemplary components of computer 1302. As shown in FIG. 14, computer 1302 may include processing logic 1410, memory 1420, user interface 1460, and communication interface 440. Processing logic 1410 may include a processor, microprocessor, an application specific integrated circuit (ASIC), field programmable gate array (FPGA), or the like. Processing logic 1410 may include data structures or software programs to control operation of computer 1302 and its components. Memory 1420 may include a hard disk drive (HDD), a random access memory (RAM), a read only memory (ROM), flash memory, a removable memory (such as storage medium 1306), and/or another type of memory to store data and/or instructions that may be used by processing logic 1410, e.g., any type of a computer-readable medium.

User interface 1460 may include mechanisms for inputting information to computer 1302 and/or for outputting information from computer 1302. Examples of input and output mechanisms may include a speaker to receive electrical signals and output audio signals, a microphone to receive audio signals and output electrical signals, a keyboard to permit data and control commands to be input, and/or a display to output visual information. The display may show content, such as images or video.

Communication interface 1440 may include, for example, a USB port for communications over a cable. Alternatively, communication interface 1440 may include a transceiver to perform functions of both a transmitter and a receiver. Communication interface 540 may, for example, incorporate the Bluetooth standard or a USB serial port standard.

Figure 15:
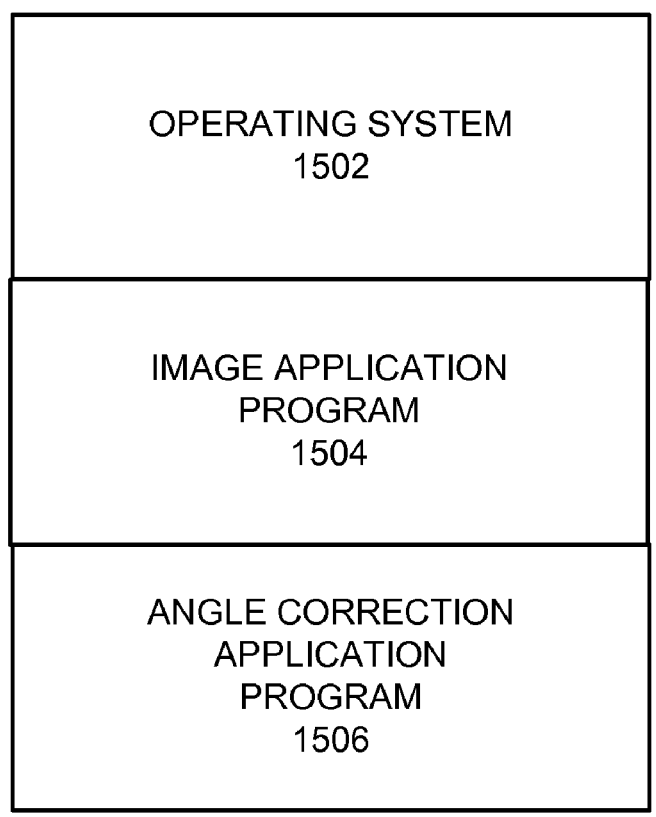
FIG. 15 is a block diagram of exemplary software components that may be implemented in the computer of FIG. 13.

FIG. 15 is a block diagram of exemplary software components that may be implemented in computer 1302 of FIG. 14, such as in memory 1420. Referring to FIG. 15, memory 1420 may include operating system 1502, image application program 1504, and angle correction application program 1506. Operating system 1502 provides a software platform on top of which application programs, such as image application program 1504 and angle correction application program 1506, can run. Memory 1420 may include other application programs not shown in FIG. 15.

Figure 16:
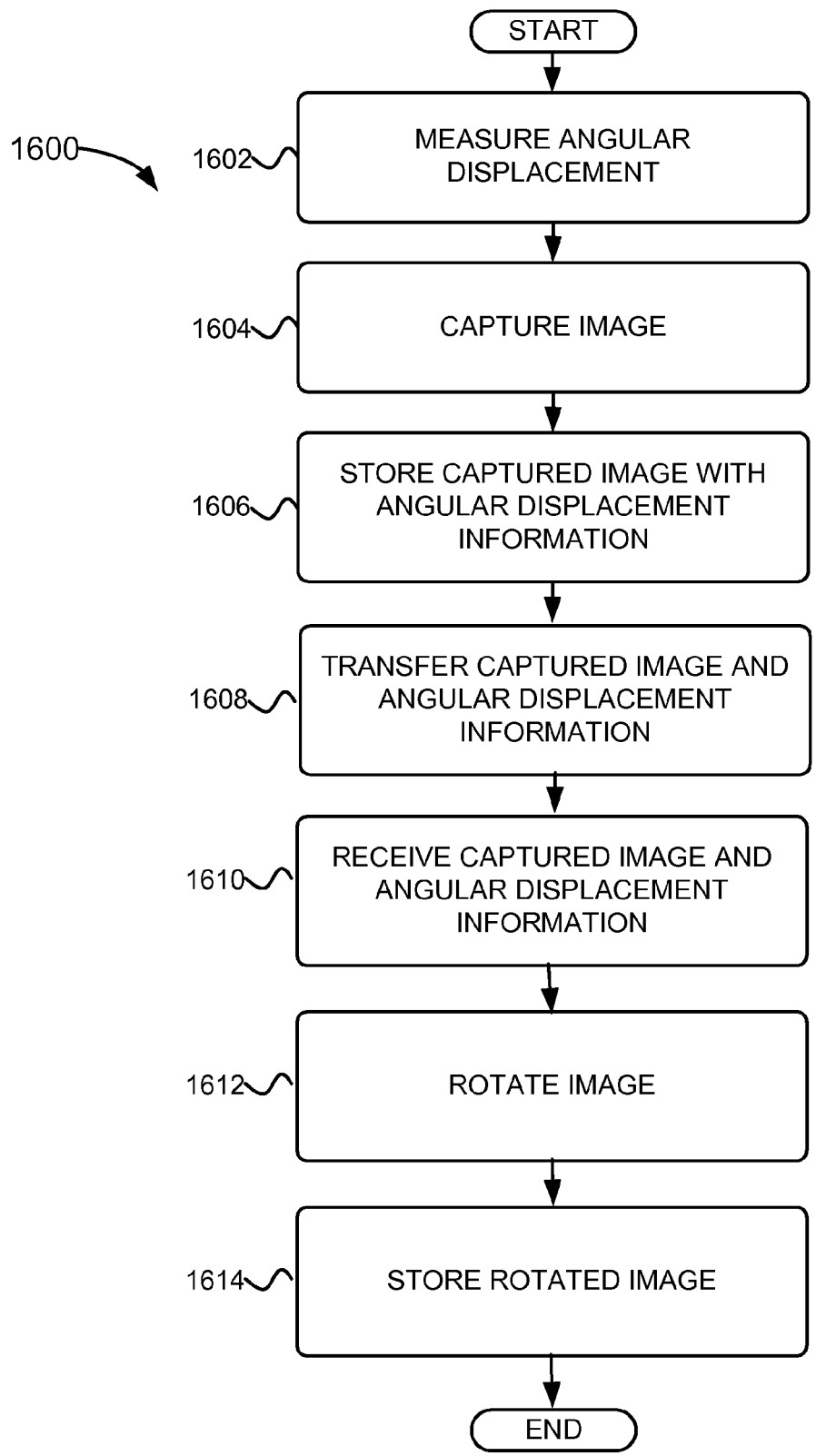
FIG. 16 is a flow chart of an exemplary process for angle correction for one embodiment described herein.

FIG. 16 is a flow chart of an exemplary process 1600 for angle correction for one embodiment described herein. Reference is made to FIG. 5 for exemplary purposes. An angle of camera 170 may be measured relative to a reference orientation, such as horizon 508 (block 1602). In other words, displacement angle 514 may be measured. Image 502 may be captured using camera 170 (block 1604). Image 502 may be captured when, for example, the user presses a shutter key. Captured image 502 may be stored with information regarding displacement angle 514 (block 1606) in, for example, memory 220 and/or removable storage medium 1306 as image file 700. Image file 700 may be transmitted to computer 1302 (block 1608). Computer 1302 may receive image file 700 (block 1610). Image file 700 may be transferred via communication link 1304, or removable storage medium 1306, for example. Image 502 may be rotated relative to the frame of image 502 based on displacement angle 514 information 706 (block 1612). In one embodiment computer 1302 rotates image 502 relative to the frame of image 502. The rotated image may be stored in, for example, memory 1420 (block 1614).

Process 1600 (blocks 1602 through 1608, for example) of FIG. 16 may be performed by camera application program 304 and angle correction application program 306 running in memory 220 of device 100. Process 1600 (blocks 1610 through 1614, for example) of FIG. 16 may be performed by image application program 1504 and angle correction application program 1506 running in memory 1420 of computer 1302. Although process 1600 in FIG. 16 shows blocks 1602-1614 in a particular order, process 1600 is not limited to blocks 1602-1614 being in this particular order. For example, displacement angle 514 may be measured before capturing image 502, after capturing image 502, or during capturing of image 502.

FIGS. 5 and 14 describe displacement angle 514 and processes 400, 1600, 800, and 1200 describe correcting displacement angle 514. Other angle corrections may be possible, including correction of elevation, e.g., the angular displacement of the LOS above the plane defined by the horizon. For example, the user may wish to point the LOS parallel to the ground, e.g., horizon. Or, the user may wish to point the LOS perpendicular to the ground, either looking upward or downward. Alternatively, the user may wish to correct azimuth angle, i.e., the angular direction of the LOS relative to a vertical plane, such as a vertical plane stretching north and south, for example. Processes 400, 1600, 800, and 1200 may be used with these other angle corrections as well, including indicating to the user when, for example, the correct elevation and/or azimuth is present and/or storing the elevation and/or azimuth angle information in the header of image file 700. Such angle information may be used during post-processing in computer 1302 to reconstruct a three-dimensional image of a photographed object, for example.

CONCLUSION

Embodiments and implementations described herein may allow for a camera user to determine when the camera is level. Further, embodiments and implementations described herein may allow for the horizon of an image to be level or square with the frame of the image. Further, embodiments and implementations herein may allow the camera user to determine when the camera is in a desirable orientation or desirable direction.

The foregoing description of embodiments provides illustration and description, but is not intended to be exhaustive or to limit the invention to the precise form disclosed. Modifications and variations are possible in light of the above teachings.

For example, while series of acts have been described with regard to FIGS. 4, 8, 12, and 16, the order of the acts may be modified in other implementations consistent with principles of the invention. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a camera to capture an image;
a sensor to measure information indicative of an angular displacement, about a line of sight of the camera, of an orientation of the camera away from a reference orientation of the camera when the camera captures the image;
storage to store the image and the measured information; and
a processor to rotate the image relative to a frame of the image based on the angular displacement,
where
when an absolute value of the angular displacement is less than 45°, the image is rotated relative to the frame based on the angular displacement,
when the absolute value of the angular displacement is greater than 45° and less than 135°, the image is rotated relative to the frame based on 90° minus the angular displacement,
when the absolute value of the angular displacement is greater than 135° and less than 225°, the image is rotated relative to the frame based on 180° minus the angular displacement, and
when the absolute value of the angular displacement is greater than 225° and less than 315°, the image is rotated relative to the frame based on 270° minus the angular displacement.

2. The device of claim 1,
where the storage stores the rotated image.

3. The device of claim 1, further comprising
a communication interface for transferring the measured information and the image to a computer for rotating the image relative to the frame of the image based on the angular displacement.

4. The device of claim 1, further comprising
an indicator to indicate when the angular displacement is zero.

5. The device of claim 1, where the processor comprises a first processor and where the device further comprises
a second processor to capture automatically the image when the angular displacement is zero.

6. A method comprising:

capturing an image in a camera;

when capturing the image, measuring information indicative of an angular displacement, about a line of sight of the camera, of an orientation of the camera away from a reference orientation of the camera;

storing the measured information for rotating the image relative to a frame of the image based on the angular displacement;

distinguishing whether the image is captured in a portrait mode where a major axis of the image is vertical or in a landscape mode where the major axis of the image is horizontal, and determining whether the image is captured upside down, rotating the image relative to the frame of the image based on the angular displacement, where when an absolute value of the angular displacement is less than 45°, the image is rotated relative to the frame based on the angular displacement, when the absolute value of the angular displacement is greater than 45° and less than 135°, the image is rotated relative to the frame based on 90° minus the angular displacement, when the absolute value of the angular displacement is greater than 135° and less than 225°, the image is rotated relative to the frame based on 180° minus the angular displacement, and when the absolute value of the angular displacement is greater than 225° and less than 315°, the image is rotated relative to the frame based on 270° minus the angular displacement; and storing the rotated image.

7. The method of claim 6, further comprising transferring the measured information and the image to a personal computer for rotating the image relative to the frame of the image based on the angular displacement.

8. The method of claim 6, further comprising indicating when the angular displacement is zero.

9. The method of claim 6, further comprising automatically capturing the image when the angular displacement is zero.

10. A device comprising:

a processor to receive an image captured by a camera; and information measured by a sensor when the camera captured the image, the measured information indicative of an angular displacement of an orientation of the camera away from a reference orientation of the camera, and to rotate the image relative to a frame of the image based on the angular displacement, where when an absolute value of the angular displacement is less than 45°, the image is rotated relative to the frame based on the angular displacement, when the absolute value of the angular displacement is greater than 45° and less than 135°, the image is rotated relative to the frame based on 90° minus the angular displacement, when the absolute value of the angular displacement is greater than 135° and less than 225°, the image is rotated relative to the frame based on 180° minus the angular displacement, and when the absolute value of the angular displacement is greater than 225° and less than 315°, the image is rotated relative to the frame based on 270° minus the angular displacement; and a computer-readable medium operationally coupled to the processor and comprising a data structure, the data structure comprising a first data field to store the image, and a second data field to store the information measured by the sensor.

11. A computer-readable medium comprising instructions to operate a processor for performing a method, the method comprising:

receiving measured information for rotating an image relative to a frame of the image, where the image was captured by a camera, where the measured information is indicative of an angular displacement, about a line of sight of the camera, of an orientation of the camera away from a reference orientation of the camera, and where the information was measured when capturing the image;

rotating the image relative to the frame of the image based on the angular displacement, where when an absolute value of the angular displacement is less than 45°, the image is rotated relative to the frame based on the angular displacement, when the absolute value of the angular displacement is greater than 45° and less than 135°, the image is rotated relative to the frame based on 90° minus the angular displacement, when the absolute value of the angular displacement is greater than 135° and less than 225°, the image is rotated relative to the frame based on 180° minus the angular displacement, and when the absolute value of the angular displacement is greater than 225° and less than 315°, the image is rotated relative to the frame based on 270° minus the angular displacement; and storing or displaying the rotated image.

12. A device comprising:

means for capturing an image in a camera;

means for measuring, when capturing the image, information indicative of an angular displacement of an orientation of the camera away from a reference orientation of the camera;

means for storing the measured information for rotating the image relative to a frame of the image based on the angular displacement; and means for rotating the image relative to the frame of the image based on the angular displacement, where when an absolute value of the angular displacement is less than 45°, the means for rotating the image rotates the image relative to the frame based on the angular displacement, when the absolute value of the angular displacement is greater than 45° and less than 135°, the means for rotating the image rotates the image relative to the frame based on 90° minus the angular displacement, when the absolute value of the angular displacement is greater than 135° and less than 225°, the means for rotating the image rotates the image relative to the frame based on 180° minus the angular displacement, and when the absolute value of the angular displacement is greater than 225° and less than 315°, the means for rotating the image rotates the image relative to the frame based on 270° minus the angular displacement.

13. The method of claim 12, where the means for storing stores the rotated image.

14. The method of claim 12, further comprising
means for transferring the stored measured information and the image to a personal computer for rotating the image relative to the frame of the image based on the angular displacement.

15. The method of claim 12, further comprising
means for indicating when the angular displacement is zero.

16. The method of claim 15, further comprising
means for automatically capturing the image when the angular displacement is zero.

* * * * *